United States Patent
Koppetz

(10) Patent No.: US 7,428,381 B2
(45) Date of Patent: Sep. 23, 2008

(54) ELECTRONIC MOTION PICTURE CAMERA

(75) Inventor: Michael Koppetz, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 188 days.

(21) Appl. No.: 11/044,955

(22) Filed: Jan. 27, 2005

(65) Prior Publication Data

US 2005/0168612 A1   Aug. 4, 2005

(30) Foreign Application Priority Data

Jan. 30, 2004   (DE) .................. 10 2004 004 806

(51) Int. Cl.
*G03B 13/02* (2006.01)
*G03B 17/20* (2006.01)
*H04N 5/225* (2006.01)

(52) U.S. Cl. .................. 396/296; 396/374; 348/341; 348/343; 348/368; 348/333.09; 386/117

(58) Field of Classification Search .................. 396/296, 396/374; 348/333.09, 341, 344, 239, 343, 348/367, 368; 386/117
See application file for complete search history.

(56) References Cited

U.S. PATENT DOCUMENTS

| | | | |
|---|---|---|---|
| 4,330,797 A | 5/1982 | Yokokawa et al. | |
| 5,099,265 A | 3/1992 | Lee | |
| 5,161,025 A * | 11/1992 | Nakao | 348/333.05 |
| 5,496,106 A | 3/1996 | Anderson | |
| 5,966,553 A | 10/1999 | Nishitani et al. | |
| 6,037,972 A | 3/2000 | Horiuchi et al. | |
| 6,757,021 B1 | 6/2004 | Nguyen-Nhu | |
| 2001/0005232 A1* | 6/2001 | Yoshioka et al. | 348/341 |
| 2001/0010546 A1 | 8/2001 | Chen | |
| 2001/0017661 A1* | 8/2001 | Shono | 348/341 |
| 2003/0169361 A1 | 9/2003 | Kandleinsberger et al. | |
| 2003/0202106 A1 | 10/2003 | Kandleinsberger et al. | |
| 2003/0214589 A1 | 11/2003 | Shibutani | |

FOREIGN PATENT DOCUMENTS

DE   3020171 C2   6/1982

(Continued)

OTHER PUBLICATIONS

Search Report issued for German Patent Application No. DE 10 2004 004 806.1 and English translation thereof.

(Continued)

*Primary Examiner*—W. B. Perkey
(74) *Attorney, Agent, or Firm*—Amster, Rothstein & Ebenstein LLP

(57) ABSTRACT

The invention relates to an electronic motion picture camera having an optical receiving system and a beam splitter which splits the receiving beam path into a taking beam path leading to an optoelectronic taking sensor and a viewfinder beam path leading to an optical viewfinder. The camera has an electronic display for the reproduction of an additional image. An optical vision mixer is arranged in the viewfinder beam path by which the taken image and the additional image can be directed in the direction of the viewfinder such that the taken image or the additional image, or the taken image and the additional image as a uniform image, can be observed in the viewfinder.

25 Claims, 8 Drawing Sheets

FOREIGN PATENT DOCUMENTS

Figure 1:
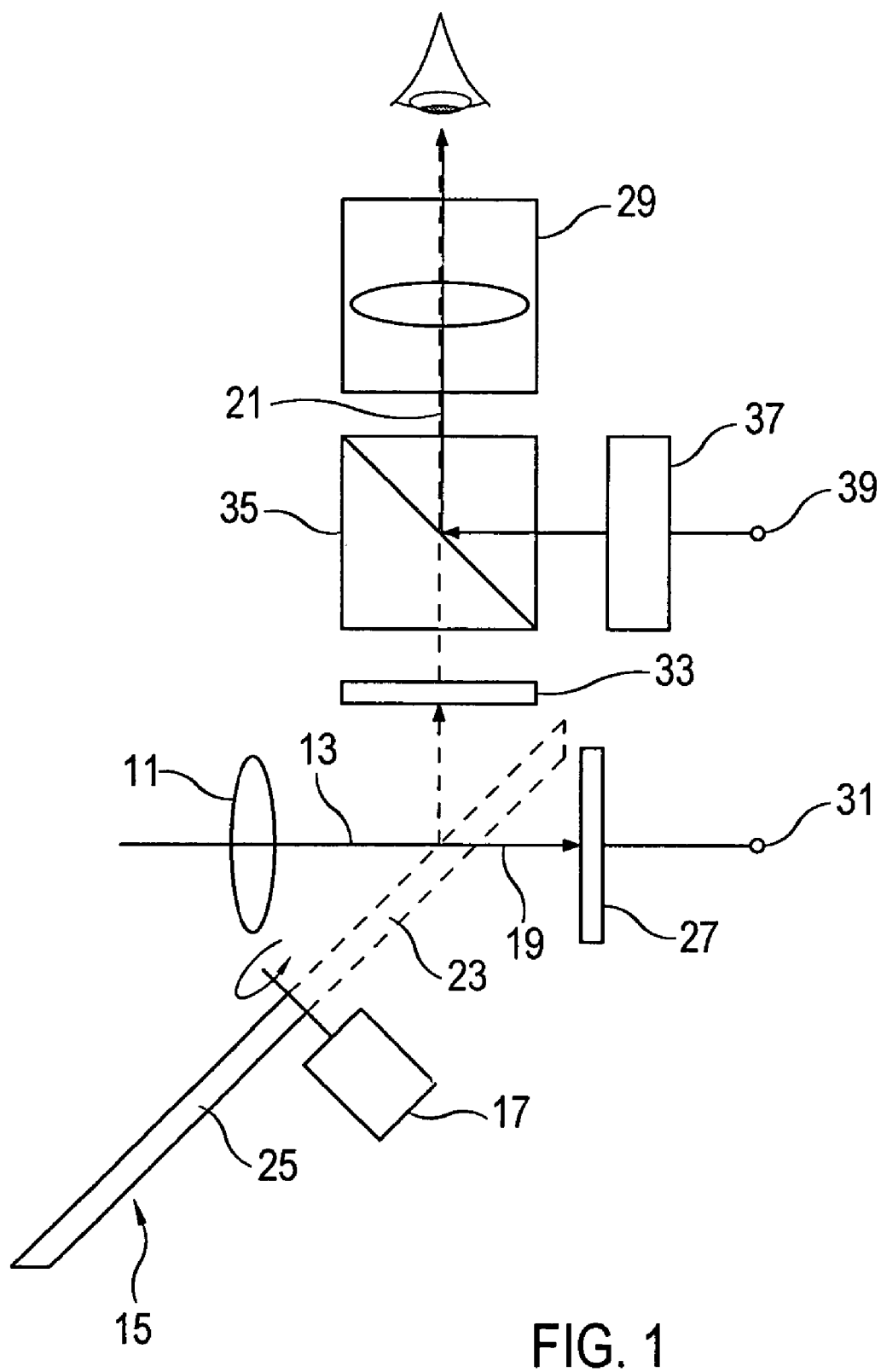

| | | |
|---|---|---|
| DE | 40 13 592 C2 | 3/1992 |
| DE | 197 20 148 A1 | 5/1998 |
| DE | 102 10 327 A1 | 9/2003 |
| DE | 102 18 313 A1 | 11/2003 |
| EP | 0 152 496 A | 8/1985 |
| EP | 1 071 277 A | 1/2001 |
| EP | 1 343 312 A | 9/2003 |
| EP | 1 363 447 A | 11/2003 |
| JP | 2003 319246 A | 11/2003 |
| WO | WO 96/31050 A | 10/1996 |
| WO | WO 99/17543 A | 4/1999 |

OTHER PUBLICATIONS

European Search Report dated Mar. 20, 2008 relating to European Patent Application No. 04 030 976.7 (4 pages).

* cited by examiner

ELECTRONIC MOTION PICTURE CAMERA

This application claims priority to German Application No. 10 2004 004 806.1, filed Jan. 30, 2004.

The invention relates to an electronic motion picture camera having an optical receiving system and a beam splitter which splits the receiving beam path into a taking beam path leading to an optoelectronic taking sensor and a viewfinder beam path leading to an optical viewfinder.

With electronic motion picture cameras, the taken wanted signal is usually displayed as a monitor image in an electronic viewfinder or on a screen attached to the camera. The taken image reproduced in this manner serves, for example, for the control of the sharpness. An electronic viewfinder has the disadvantage that the environment of the taken image cannot be observed. Potentially disturbing objects outside the taken image section can thus not be recognized before they move into the taken image. Viewfinders which are based on electronic displays are above all limited with respect to the reproduction quality.

Motion picture cameras are also known which are provided with an optical viewfinder. With these cameras, some of the light current detected by the optical receiving system is led into an optical system which is connected in parallel to the taking sensor and which indicates the same taken image for the cameraman which is also recorded by the taking sensor. A high image quality of the viewfinder can hereby be achieved. It is, however, disadvantageous that no additional image information can be made available to the cameraman.

It is thus an object of the invention to provide an electronic motion picture camera whose viewfinder has a high image quality and which can be used flexibly for different demands with respect to the reproduction of the taken image and further image information.

This object is satisfied by a motion picture camera having the features of claim 1 and in particular in that the camera has an electronic display for the reproduction of an additional image; and in that an optical vision mixer is arranged in the viewfinder beam path by which a taken image imaged by the optical receiving system and the additional image reproduced by the electronic display can be directed in the direction of the viewfinder such that the taken image, or the additional image, or the taken image and the additional image as a uniform image, can be monitored in the viewfinder.

The optical receiving system therefore images the taken image along the taking beam path on the taking sensor and moreover presents the taken image in the viewfinder, with the camera in accordance with the invention having a hybrid viewfinder system with two superimposed beam paths. An optical vision mixer which permits the presentation of the taken image detected by the optical receiving system and of an additional image generated by an electronic display is integrated into the viewfinder beam path of an optical viewfinder, with the taken image and the additional image being able to be presented to the viewer as a single, uniform motion picture or still picture in the viewfinder. The high image quality of an optical viewfinder is thereby combined with the possibility of reflecting additional image information into the viewfinder beam path by means of an electronic display or of introducing it optically in another manner.

Instead of a joint presentation of the taken image and of the additional image as a uniform image, optionally only the taken image imaged by the optical receiving system can also be presented in the viewfinder, for example prior to the start of the actual recording by means of the taking sensor. Optionally, only the additional image reproduced by the electronic display can also be presented in the viewfinder. This possibility is particularly advantageous, if the received light should be fully directed to the taking sensor and not in the direction of the viewfinder due to the poor lighting of the taking motif. In this case, the viewfinder can be used as an electronic viewfinder by means of the electronic display and of the vision mixer.

The additional image can support the cameraman in a variety of manners during the take, with the image information contained in it being able to be selected flexibly in dependence on the specific taking situation. The actual taking image and the additional image can optionally be presented in the optical viewfinder simultaneously, alternatively to one another, alternately in time or alternately with a time overlap.

The electronic display is in particular made for the reproduction of motion pictures or of still pictures which supplement the actual taken image presented in the viewfinder. Those motion pictures can be reproduced at the display which are particularly substantially recorded simultaneously in time, i.e. synchronously, or with a time lag caused by the electronic sensor system, by means of the taking sensor. The taken image presented in the viewfinder via the optical receiving system and the taken image of the taking sensor reproduced by the display can thereby complement one another in time so that the taken image observable in the viewfinder does not flicker.

Since the viewfinder is made as an optical viewfinder, a high image quality is ensured without the known technical limitations of an electronic monitor image. The optical viewfinder can moreover be configured such that the image section imaged by the optical receiving system in the direction of the viewfinder and observable there is larger than the image section of the taken image actually taken by the taking sensor so that the cameraman can also observe the environment of the actually taken image section.

Although an optical viewfinder is provided, it can be used by means of the electronic display and the optical vision mixer to view already taken and stored motion picture sequences. The optical viewfinder can therefore be used for the monitoring of a motion picture sequence already recorded at an earlier point in time. Stored motion picture sequences can even be superimposed on the actual taken image during a new take, for example as a reference for the camera work.

Alternatively, the reproduction of different brightness range characteristics, sharpness range characteristics or distance range characteristics (in the form of a "depth card") can be superimposed on the actual taken image and offer the cameraman additional support during the take. It is furthermore possible to present image format marks or alphanumeric information in the viewfinder by means of the electronic display and the optical vision mixer.

A particular advantage results from the use of a rotating mirror aperture as a beam splitter in the receiving beam path. In this case, the rotation of the mirror aperture necessarily results in an intermittent masking of the incident light on the taking sensor. With the camera in accordance with the invention, these masking time intervals can be reduced with respect to those time intervals in which the incident light is deflected in the direction of the viewfinder. The flickering in the viewfinder caused hereby can namely be balanced in that the taken image recorded by the sensor is introduced into the viewfinder beam path via the electronic display and the optical vision mixer.

The camera explained is preferably made as a digital electronic motion picture camera with a digitizing device connected downstream of the taking sensor.

The invention also relates to the use of an optical vision mixer for the presentation of a taken image imaged by an optical receiving system and of an additional image reproduced by an electronic display in an optical viewfinder of an electronic motion picture camera.

The invention furthermore relates to a method for the presentation of a taken image and of an additional image in an optical viewfinder of an electronic motion picture camera, with an optical receiving system imaging the taken image along a taking beam bath on a taking sensor and presenting it along a viewfinder beam path in a view finder, with an electronic display reproducing the additional image and with an optical vision mixer directing the taken image imaged by the optical receiving system and the additional image reproduced by the electronic display in the direction of the viewfinder such that the taken image, or the additional image, or the taken image and the additional image as a uniform image, can be observed in the viewfinder.

Further embodiments of the invention are recited in the dependent claims. The invention will be described in the following purely by way of example with reference to the drawings, with similar elements being characterized by the same reference numerals.

FIGS. 1 to 8 show different embodiments of an electronic motion picture camera.

FIG. 1 shows a first embodiment of an electronic motion picture camera. It has an optical receiving system 11 which images the motion picture to be recorded along a receiving beam path 13. The light incident along the receiving beam path 13 is alternately transmitted in the direction of a taking beam path 19 or deflected in the direction of a viewfinder beam path 21 by means of a mirror aperture 15 which serves as a beam splitter and which can be driven to make a rotational movement by a drive unit 17. For this purpose, the mirror aperture 15 has a transmission region 23 and a mirror-coated masking region 25.

A taken image detected by the optical receiving system 11 is thus alternately imaged along the taking beam path 19 on an optoelectronic taking sensor 27 and deflected along the viewfinder beam path 21 to be presented in an optical viewfinder 29. The taking sensor 27 is imaged, for example, by a CCD or CMOS image converter and it has a signal output 31 to output a received signal.

A matt glass screen 33 is arranged in the viewfinder beam path 21 and the taken image detected by the optical receiving system 11 is imaged on it, provided the masking region 25 of the mirror aperture 15 is located in the receiving beam path 13. A real image thereby arises on the matt glass screen 33 which the cameraman can observe by means of the viewfinder 29.

An optical vision mixer 35 is furthermore arranged in the viewfinder beam path 21 and, on the one hand, permits the viewing of the matt glass screen 33 through the viewfinder 29 and, on the other hand, presents an additional image reproduced by an electronic display 37 in the viewfinder 29. The additional image of the electronic display 37 is therefore superimposed on the matt glass screen image by means of the optical vision mixer 35, with the two superimposed images appearing to the viewer as one single image in the viewfinder 29 with a corresponding matching of the two optical branches. For this purpose, the display 37 and the matt glass screen 33 are arranged in the same object plane or focus position of the viewfinder 29.

The optical vision mixer 35 is formed, for example, by a partly transmitting mirror. The electronic display 37 is formed, for example, by a liquid crystal monitor, a TFT (thin film transistor) monitor or a tube monitor (CRT, cathode ray tube). It has a signal input 39 via which the additional image or corresponding image signals can be supplied.

The use of an optical viewfinder 29 in conjunction with a matt glass screen 33 ensures a high quality of the viewfinder image. Despite the use of an optical viewfinder system, an additional image can also be displayed to the cameraman in the viewfinder 29 by means of the display 37 and the vision mixer 35 in order hereby to support the take in a varied and flexible manner.

It is in particular possible for motion pictures or still pictures to be reproduced on the electronic display 37 which supplement the taken image intermittently imaged on the matt glass screen 33 in time such that a flickering of the imaged taken image possibly caused by the rotation of the mirror aperture 15 is avoided. The electronic display 37 and the optical vision mixer 35 can also be used to display a motion picture sequence just taken in the viewfinder 29 for control purposes. Alternatively or additionally, any other image information can be reflected into the viewfinder beam path 21 by means of the display 37 and the vision mixer 35.

A further advantage of this camera consists of the fact that an image can be seen in the viewfinder 29 on the preparations of a take, while the mirror aperture 15 is still standing and the transmission region 23 is located in the receiving beam path 13: the taking sensor 27 can deliver a received signal during the taking preparations which is used, for example, for test and reference purposes. At the same time, an image observation is possible in the viewfinder 29 despite the mirror aperture 15 standing in that the received signal of the taking sensor 27 is supplied via the signal input 39 to the electronic display 37 and is displayed by this in the viewfinder 29 via the optical vision mixer 35.

The camera preferably has an adjustment device by which the reproduction of the additional image of the electronic display 37 can be adjusted relative to the taken image imaged on the matt glass screen 33. The size, the position, the alignment or other geometrical properties of the additional image can, for example, be adapted by such an adjustment in order to achieve an overlap of identical geometry with the taken image in the viewfinder 29. This adjustment preferably takes place in an electronic manner.

It is naturally also possible—in deviation from the representation in accordance with FIG. 1—for the matt glass screen 33, the optical vision mixer 35 and the viewfinder 29 to be arranged in an L shape so that the vision mixer 35 deflects the taken image imaged on the matt glass screen 33 in the direction of the sensor 29 in the direction of the viewfinder 29, whereas the additional image of the electronic display 37 is reproduced, for example, in a straight line by the vision mixer 35.

The use of the matt glass screen 33 is not absolutely necessary. Instead, the optical receiving system 11 can generated a virtual image in the viewfinder beam path 21 which can be viewed together with the additional image of the display 37 in the viewfinder 29.

Basically, a beam splitter which continuously splits the incident light current can also be provided instead of the mirror aperture 15.

Figure 2:
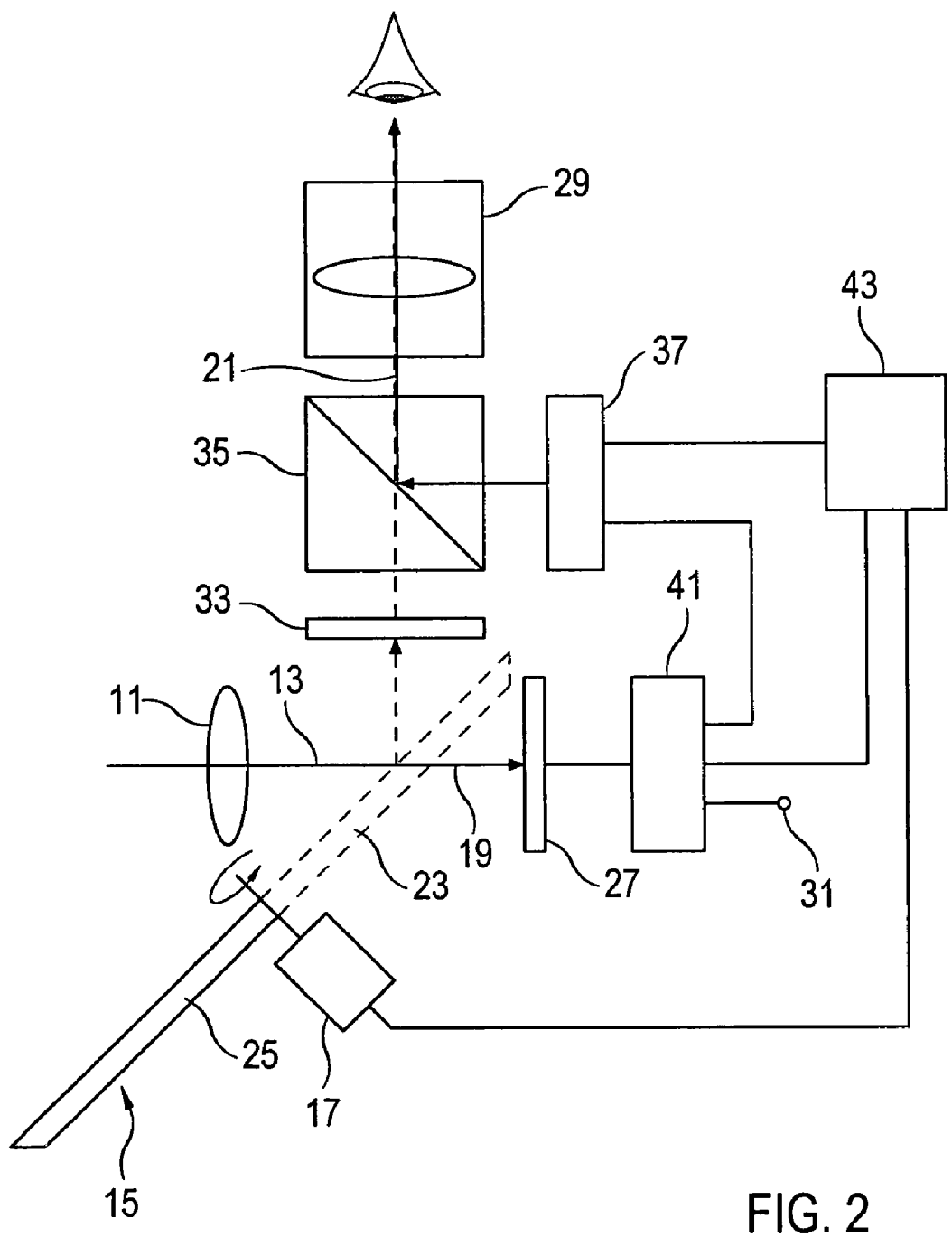

FIG. 2 shows a further development of the embodiment in accordance with FIG. 1. In this, a signal processing device 41 is provided which is connected downstream of the taking sensor 27. This prepares the received signal of the taking sensor 27, for example by amplification and preferably by additional digitizing. The prepared signal is output as a desired signal at the signal output 31, on the one hand, and is transmitted to the electronic display 37, on the other hand.

The electronic display 37 can thus reproduce the current received signal of the taking sensor 27 in real time as an additional image. In the optical vision mixer 35, the taken image recorded by the taking sensor 27 is thereby superimposed on or supplements in time that taken image which is imaged on the matt glass screen 33 by the optical receiving system 11 via the rotating mirror aperture 15. The taken image observable in the viewfinder 29 thus appears particularly calm, without any irritating flickering.

A control device 43 is optionally provided which synchronizes the drive unit 17 of the mirror aperture 15, the taking sensor 27 and the electronic display 37 such that the taken image imaged on the matt glass screen 33 by the optical receiving system 11 via the mirror aperture 15 and the received signal 37 of the taking sensor 27 reproduced by the electronic display 37 can be observed substantially alternately, i.e. precisely alternately or with a time overlap, in the viewfinder 29.

The control device 43 shown in FIG. 2 can also control the drive unit 17 of the mirror aperture 15 such that the optical receiving system 11 only images the taken image on the taking sensor 27 during an image sequence to be recorded. In other words, the mirror aperture 15 is temporarily brought to a standstill so that the transmission region 23 is located in the received beam path 13. Since the taken image is thus no longer imaged on the matt glass screen 33, the control device 43 causes the display 37 to reproduce the current received signal of the taking sensor 27 as an additional image during the whole image sequence. The viewfinder 29 thus serves as a purely electronic viewfinder. This is of particular advantage under poor light conditions, since the total received light can be completely directed to the taking sensor 27.

Figure 3:
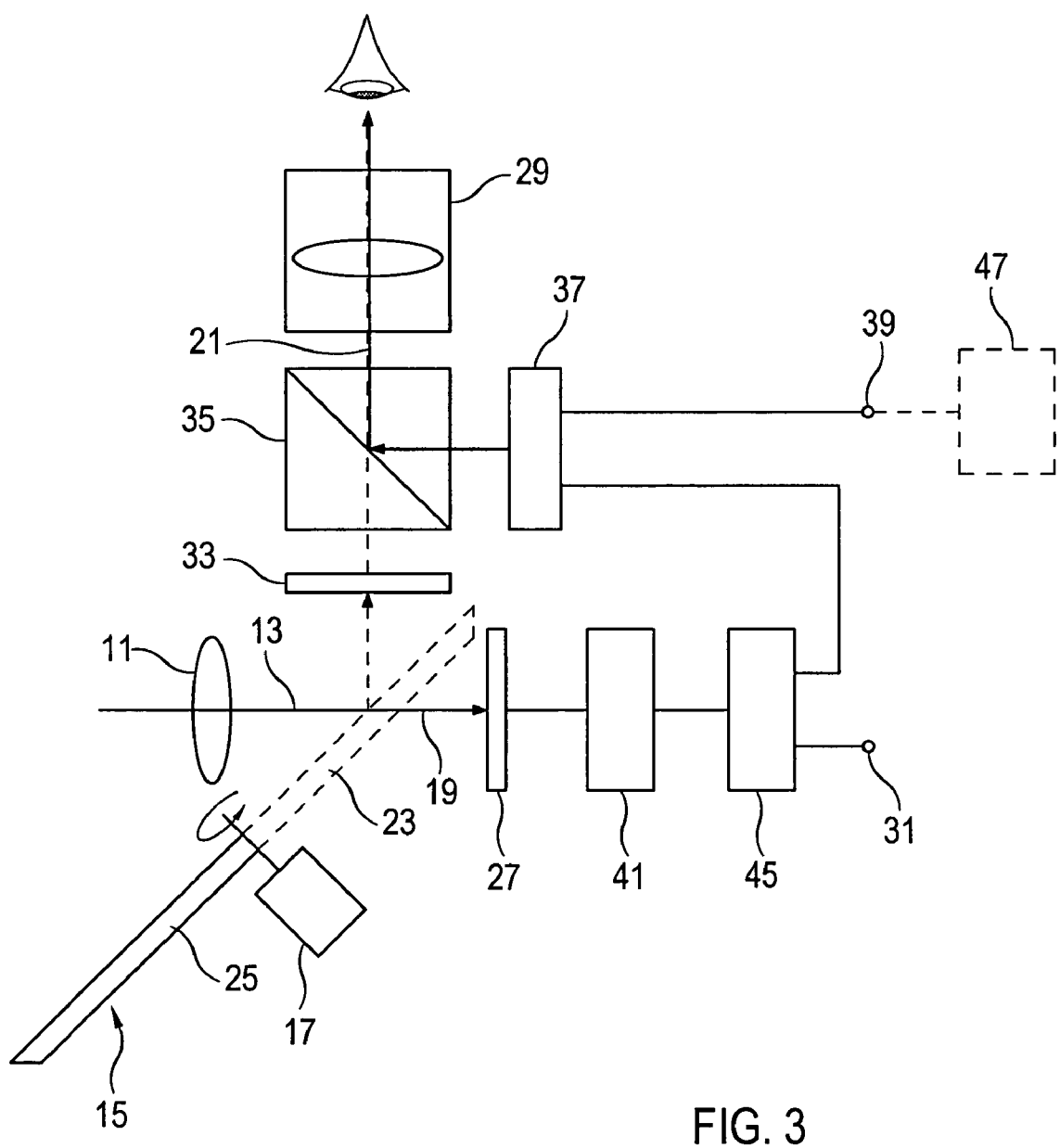

FIG. 3 shows a further development in which an image memory device 45 is connected downstream of the taking sensor 27 and of a signal processing device 41. This delivers the prepared received signal of the taking sensor 27 to a signal output 31. A further signal output is connected to an input of the electronic display 37. Motion picture data or still picture data, which were recorded by the taking sensor 27 at an earlier point in time and stored in the image memory device 45, can thus be reproduced at the electronic display 37 and thus be observed in the optical viewfinder 29. The image memory device 45 thereby permits the viewing of a previously taken motion picture sequence in the viewfinder 29 without an additional image monitor being required for this purpose.

A particular advantage of the embodiment in accordance with FIG. 3 consists of the fact that a motion picture sequence previously recorded by means of the taking sensor 27 can be superimposed on the taken image imaged on the matt glass screen 33 during a new take, for example to provide the cameraman with a reference for the camera work.

Alternatively or additionally, the electronic display 37 or a data buffer connected thereto can have a signal input 39 to which an external memory device 47 can be connected to supply motion picture data or still picture data to the electronic display 37 which should be reproduced as an additional image in the viewfinder 29 by means of the optical vision mixer 35. It is in particular possible by the connection of an external memory device 47 to reproduce picture elements at the electronic display 37 which were generated or processed by computer and which should be inserted in the post-processing of the take. Since these picture elements are already made visible to the cameraman during the take, he can take the interaction of the real scene with the virtual picture elements into account. The camera work is hereby substantially facilitated and it is avoided that a recorded motion picture sequence subsequently proves to be unsuitable for the desired post-processing.

The explained fading of an additional motion picture sequence into the optical viewfinder 29 is therefore particularly advantageous for the so-called compositing, that is for the recording of motifs in front of a blue background (blue screen) for the subsequent superimposition of a plurality of different motifs in the post-processing. If, for example, the shooting of a real actor in front of a blue screen should later be superimposed with a representation of a further figure generated artificially or by a technical trick (e.g. an alien or the like), the artificially generated representation can already be faded into the optical viewfinder 29 for the cameraman by means of the electronic display 37 during the shooting of the real actor in front of the blue screen. The cameraman can thus simultaneously observe the real take and the additionally faded-in representation of the technical trick motif and can influence the camera work accordingly so that it is ensured that the final superimposition of the real scene and of the artificial scene is possible in the post-processing without problem.

Figure 4:
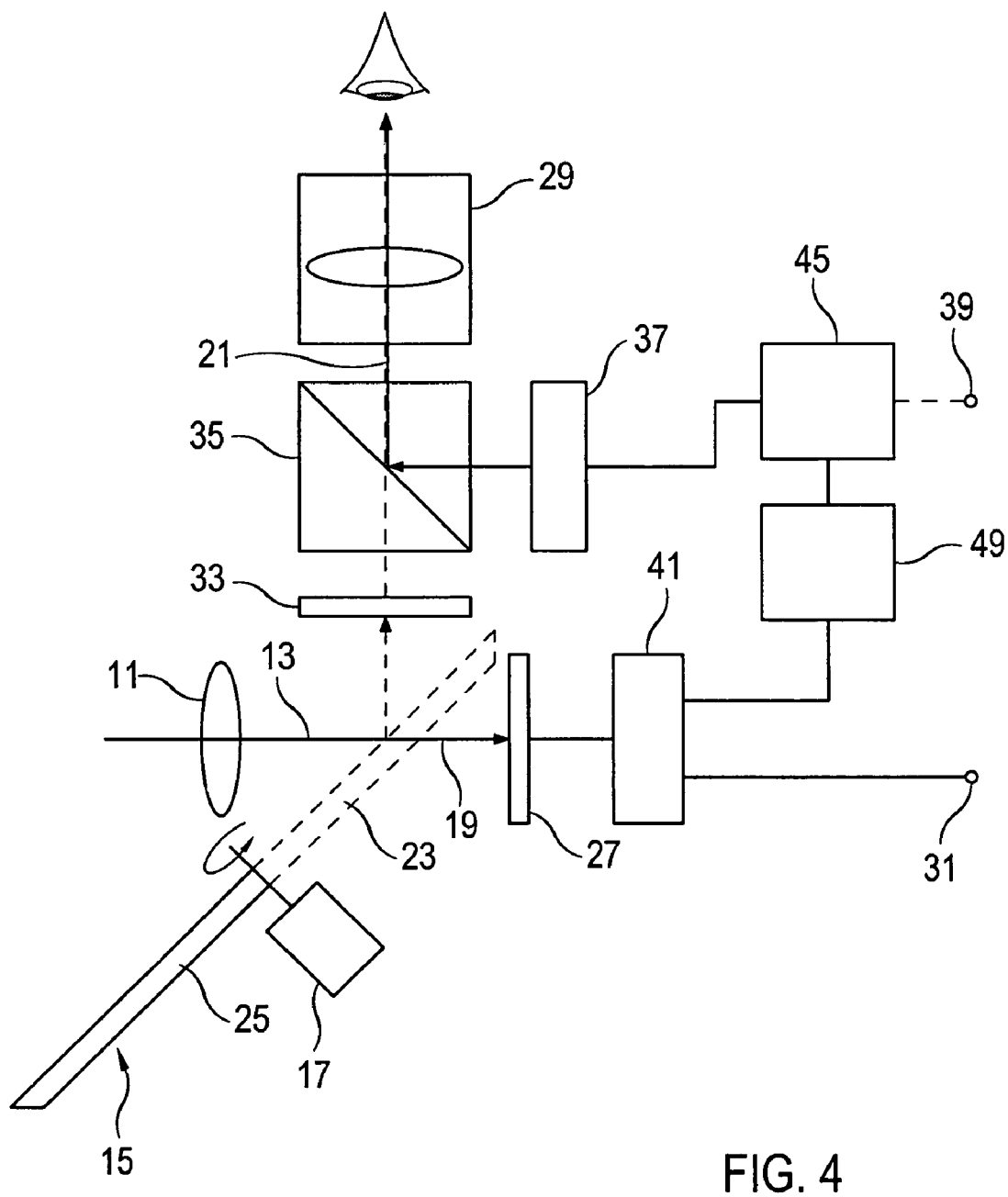

FIG. 4 shows a modification of the embodiment in accordance with FIG. 3. In this, an evaluation and control device 49 is connected at the input side to a signal processing device 41 connected downstream of the taking sensor 27. At the output side, the evaluation and control device 49 is connected to an image memory device 45 which is connected to the electronic display 37.

The evaluation and control device 49 is configured such that it controls the time of the reproduction of a motion picture sequence stored in the image memory device 45 on the electronic display 37 in dependence on the camera movement. In a simple case, the motion picture sequence is reproduced as soon as the evaluation and control device 49 detects the start of the camera movement or of a recording by means of the taking sensor 27. The evaluation and control device 49 can also be configured such that it evaluates the current received signal of the taking sensor 27 with respect to an object movement inside the taken image and controls the reproduction frequency with which motion picture data or still picture data stored in the image memory device 45 are reproduced at the electronic display 37 in dependence on this.

As explained in connection with FIG. 3, a previously recorded motion picture sequence can, for example, be stored in the image memory device 45 which serves as a reference for the camera work or the image data stored in the image memory device 45 corresponds to virtual picture elements which should be inserted into the post-processing of the take. The evaluation and control device 49 can control the replay of these stored image data (start point and end point, run speed) in dependence on the camera movement and/or on the received signal of the taking sensor 27 in order to ensure a synchronization of the stored event with the real take.

The image data to be inserted via the electronic display 37 can also alternatively come from an external memory device in the embodiment in accordance with FIG. 4. In this case, the additional image is supplied to the camera via a signal input 39, with the image memory device 45 being able to serve as a data buffer.

Figure 5:
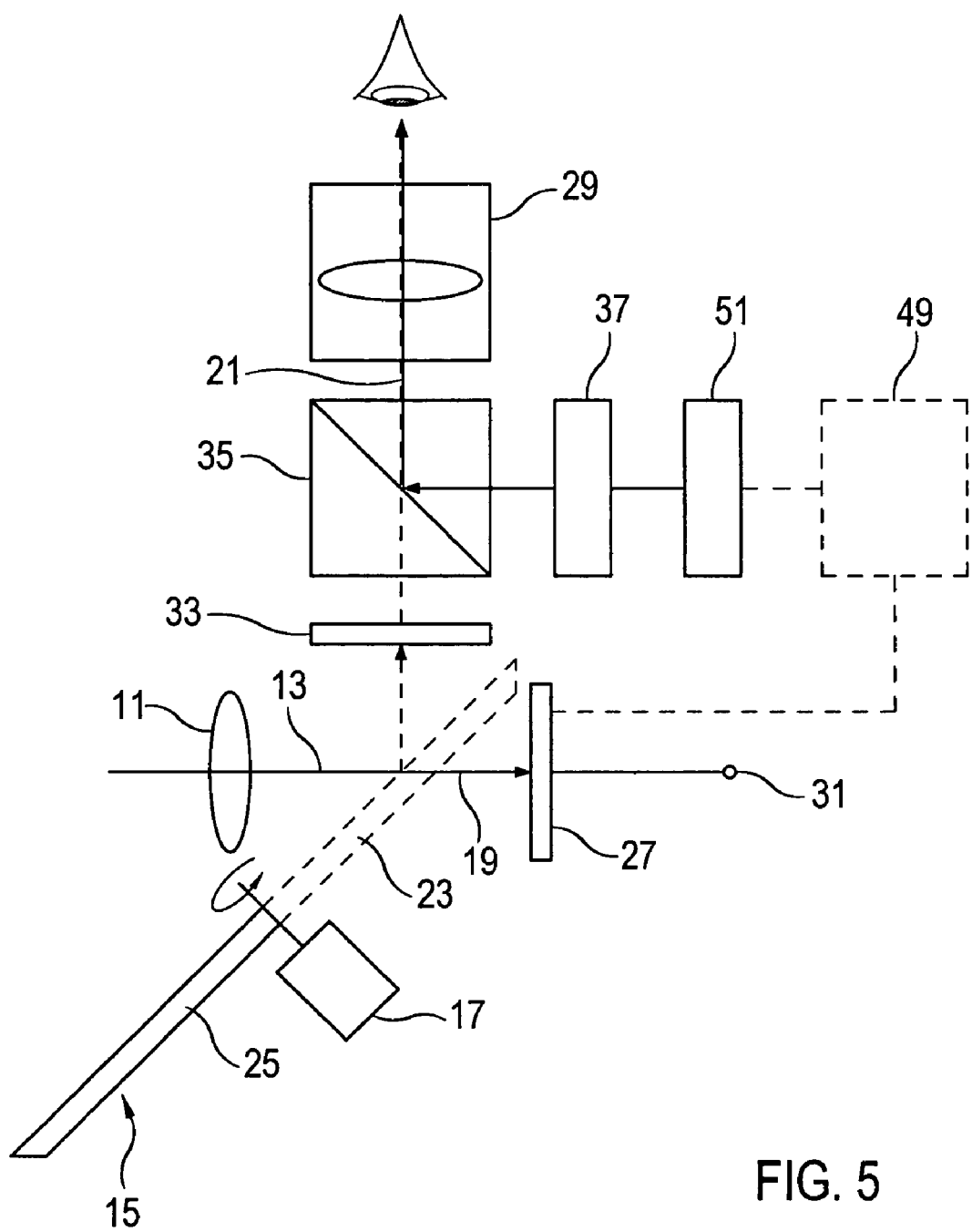

FIG. 5 shows an embodiment in which the display 37 is connected at the input side to an image generator 51 which, for example, generates image area marks, image format markings, other graphical information or alphanumeric information as an additional image which should be reproduced at the display 37.

For example, a frame can be superimposed on the taken image imaged on the matt glass screen 33 by means of the image generator 51, the display 37 and the vision mixer 35 which marks the image section of the associated image format in dependence on the purpose of the recording (cinema or television). A permanent marking of the matt glass screen 33 or a replacement of differently marked matt glass screens 33 is thus not necessary. The image information generated by the image generator 51 can, for example, also be an alphanumeric identification of the set aperture or of the set depth of field range.

The image generator 51 is optionally connected at the input side to an evaluation and control device 49 which is in turn connected at the input side to the taking sensor 27 or to an associated signal processing device. The evaluation and control device 49 evaluates the received signal of the taking sensor 27 with respect to pre-determined brightness or sharpness values and causes the image generator to generate corresponding brightness range mark or sharpness range marks which are reproduced at the electronic display 37. An electronic image specially prepared from the sensor image is thus superimposed on the taken image observable at the matt glass screen 33 in order to draw the attention of the cameraman to areas with a specific brightness or sharpness (modulation frequency). These areas can be marked by the image generator 51, for example by hatching.

In accordance with an advantageous embodiment, the evaluation and control device 49 can respectively compare the received signal of the taking sensor 27 for the individual picture elements of the taken image, for example by means of a comparator, with an upper brightness threshold value or with a lower brightness threshold value or with both the said brightness threshold values. In this case, the evaluation and control device 49 can calculate or determine at least one brightness range of the taken image within which the respective received signal exceeds the upper brightness threshold value or does not reach the lower brightness threshold value for the picture elements of the taken image or at least for a predominant proportion of the picture elements. The image generator 51 generates corresponding brightness range marks, for example the already named hatching, on the basis of the brightness ranges thus determined. These brightness range marks are therefore generated at the display 37 and are thus visible in the optical viewfinder 29 as warning signs superimposed with respect to the taken image.

The generation and display of such brightness range marks is particularly of importance with motion picture cameras having an optoelectronic taking sensor, since this generally has a lower brightness dynamic range than conventional photochemical film material, with the threshold values for critical upper and lower brightness values being sensor-dependent. It is therefore advantageous if image regions can be displayed to the cameraman in which the brightness values of the motif to be recorded could prove to be problematic so that the cameraman can take account of the explained warning signs or image region marks during the camera work. This function is important for a test run, on the one hand, in order optionally to be able to alter the set (for example in that a coffee pot reflecting the sunlight is moved into the shade). On the other hand, this function is important for the actual, final take, since the cameraman thus has a control possibility that no problematic brightness areas are also actually recorded during the take. If, in contrast, it were only to be found after the take, namely on the viewing of the recorded film scene, that problematic brightness values or brightness regions had been recorded, a subsequent repeat recording of the film scene would mostly be very costly or even impossible, since the set would have to be recreated again.

It is important that the cameraman himself—and not any other person—can observe the explained brightness range marks, and indeed in the optical viewfinder. The cameraman can therefore himself keep control of the brightness modulation of the taken image and, optionally, influence the camera work accordingly, and he does not have to dispense with the use of the customary optical viewfinder 29 to do so. It is also important that not only a simple warning signal is transmitted to the cameraman, but rather that it is specifically indicated in which picture region the error occurs.

The function of the display of image region marks and in particular of brightness range marks is also of importance for the compositing already mentioned in connection with FIG. 3, that is for the recording of motifs in front of a blue screen. It is also namely important here that the split of the taken image into different color regions or brightness regions—that is the quality of the segmentation—can be observed and controlled. It can, for example, prove to be problematic if a person wearing a green item of clothing, or even a blue item of clothing, is filmed in front of the blue screen. Potentially critical image regions can be indicated to the cameraman by the explained comparison of the received signals with corresponding threshold values.

It is of advantage for the named application of the compositing for the received signals of the taking sensor 27 to be compared with different threshold values for the different picture elements with respect to each of the colors red, green and blue, since the received signals of the color blue, for example, are more critical than the received signals of the color green. A comparison with a brightness threshold value also does not necessarily have to be carried out for each color. For example, such a comparison is not absolutely necessary for the color red with respect to the compositing.

Figure 6:
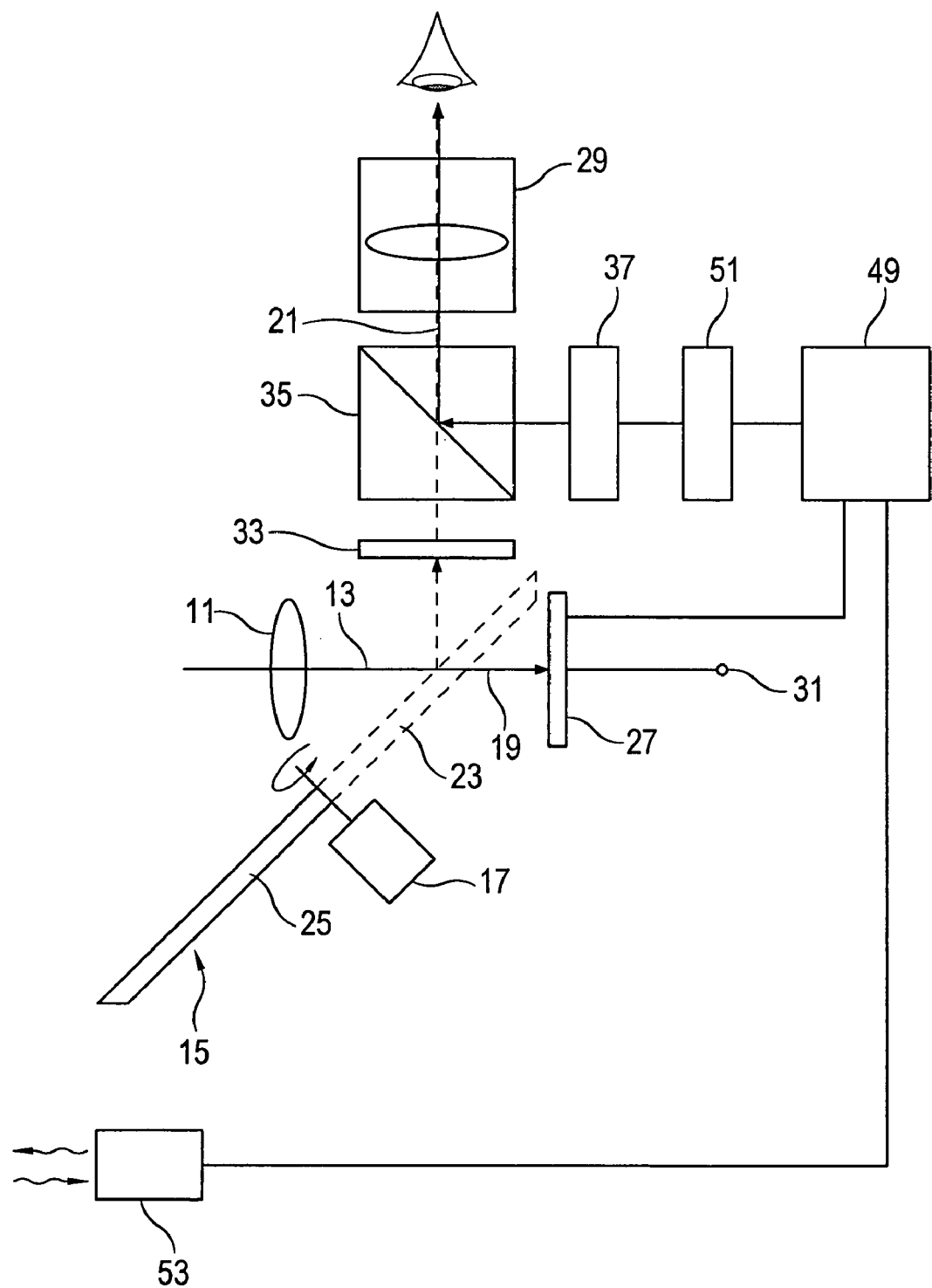

FIG. 6 shows a modification of the embodiment in accordance with FIG. 5 in which a range finding device 53 is additionally provided. It is, for example, formed by an infrared sensor or a laser range finder. The range finder device 53 is connected to an evaluation and control device 49 which is connected to the taking sensor 27 at the input side and to an image generator 51 for the electronic display 37 at the output side.

The range finder device 53 can measure the distance of the camera from an object within the recorded object space. The corresponding measured signal can be evaluated by the evaluation and control device 49 for different distance regions of the object space and thus of the taken image recorded by the taking sensor 27. Depending on this evaluation, the evaluation and control device 49 causes the image generator 51 to generate corresponding distance region marks which are reproduced by the electronic display 37 and are thus superimposed on the matt glass image.

In this manner, a type of "depth map" is made available to the cameraman in the viewfinder 29 which permits a fast identification of the object spacings and/or of the sharpness plane—for example by different coloring (false color representation), by hatching or by presentation of different distance ranges with different brightness. In particular the adjustment of a desired depth of field region is hereby facilitated. A plurality of range finding devices 53 can naturally be provided to detect the different distance regions of the taken image fast and with high resolution.

Figure 7:
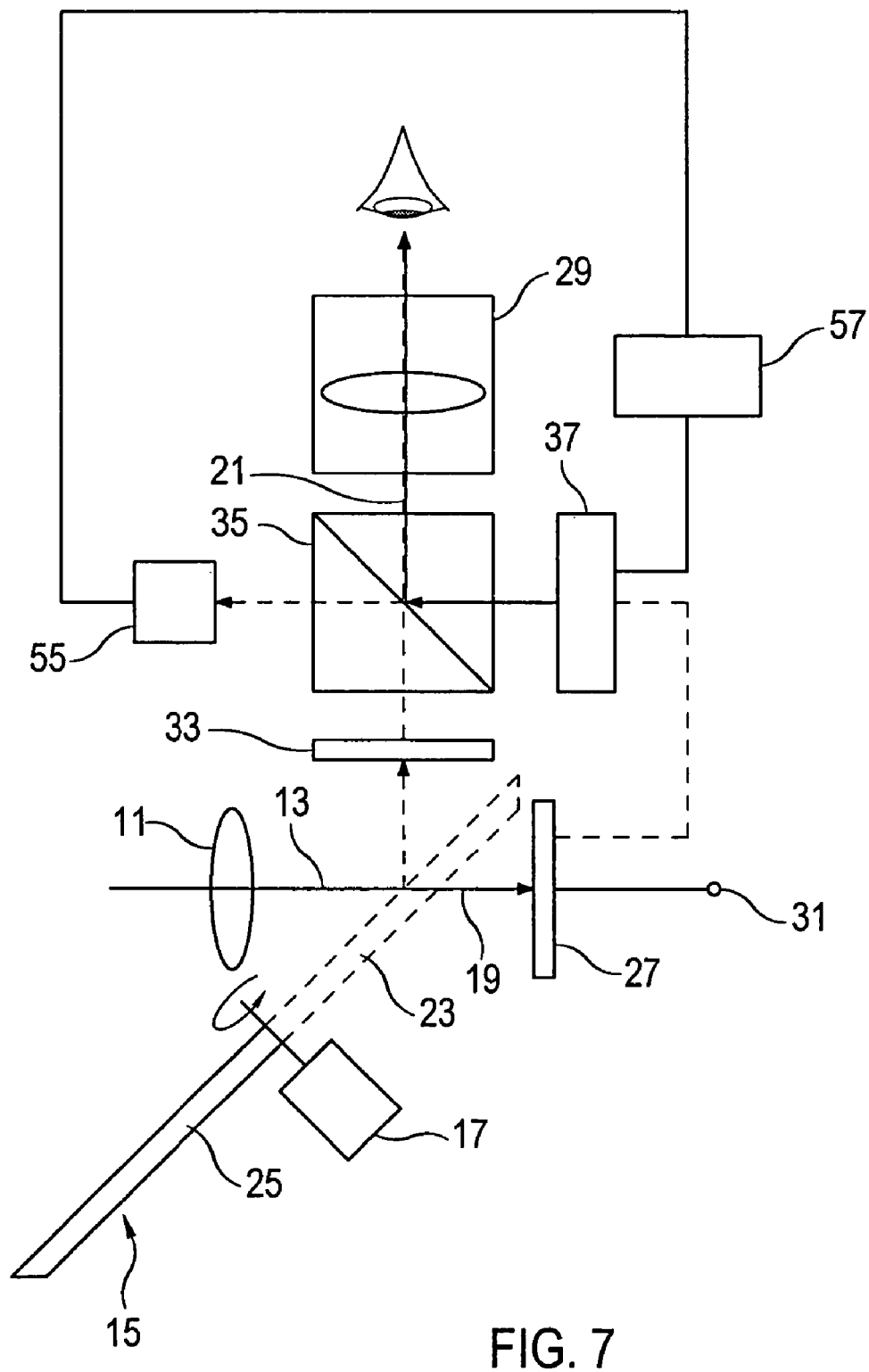

FIG. 7 shows an embodiment with a photodetector 55 which measures the brightness of the taken image imaged on the matt glass screen 33 by the optical receiving system 11. The photodetector 55 is connected to a brightness regulation device 57 which regulates the brightness of the reproduction of the additional image at the electronic display 37 in dependence on the measured brightness of the matt glass screen image. The brightness regulation device 57 can be configured, for example, such that the taken image imaged by the optical receiving system 11 and the additional image of the electronic display 37 superimposed thereon are seen by the viewer with the same brightness or with a brightness difference which remains the same.

Instead of the shown brightness regulation device 57 with a photodetector 55, a simple brightness control device can also be provided which is connected to the electronic display 37 in order to be able to set the brightness of the reproduction of the additional image to a desired value.

It is preferred for the embodiment in accordance with FIG. 1 for the optical vision mixer 35—for example in the form of a partially transmitting mirror—to be able to direct both the taken image imaged on the matt glass screen 33 by the optical receiving system 11 and the additional image of the electronic display 37 in the direction of the viewfinder 29 simultaneously.

Figure 8:
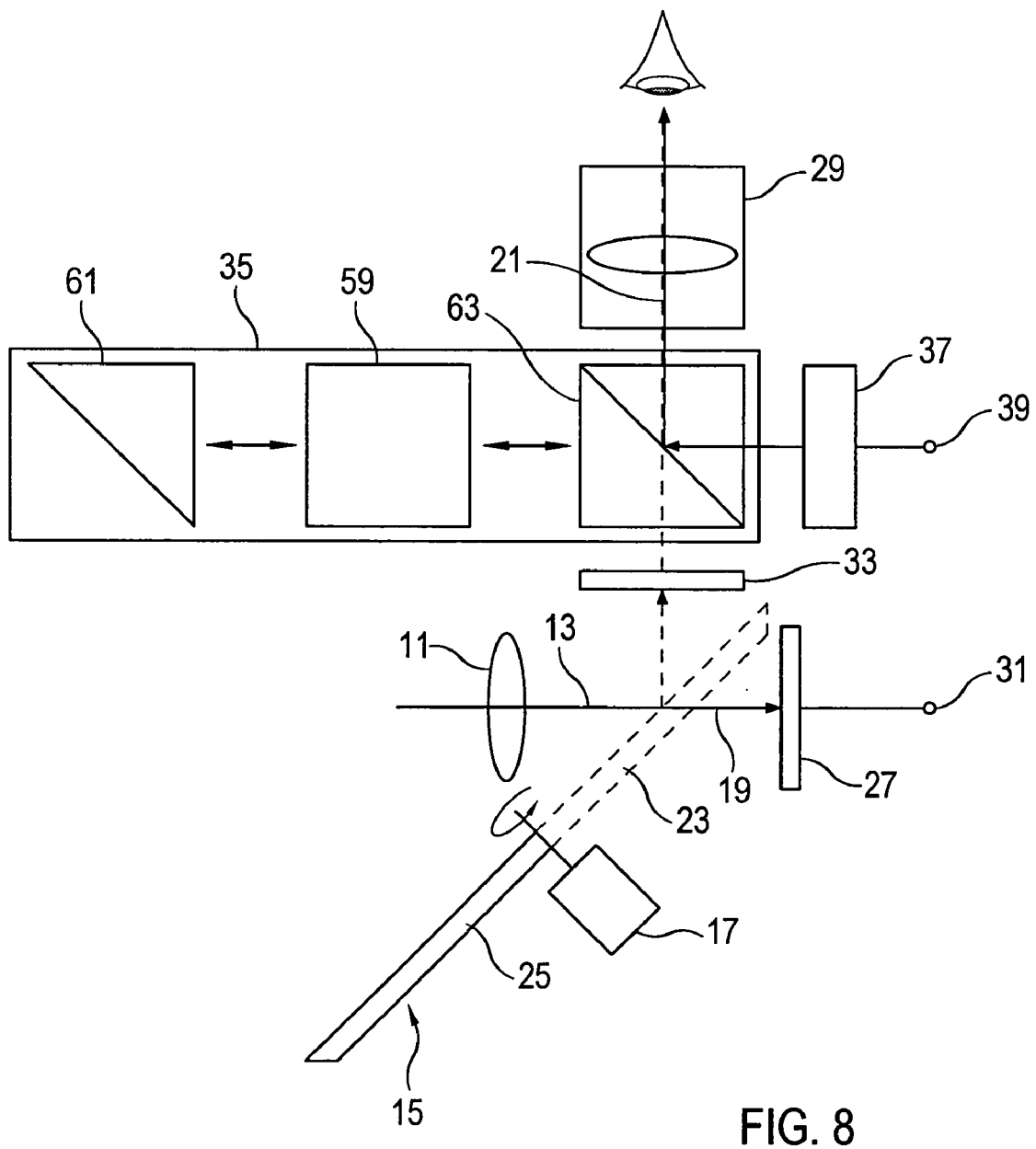

FIG. 8 shows an alternative embodiment to this in which the optical vision mixer 35 selectively directs the taken image imaged by the optical receiving system 11 or the additional image of the electrical display 37, or simultaneously the taken image and the additional image, in the direction of the viewfinder 29. For this purpose, the vision mixer 35 can have a fully transmitting section 59, a fully reflective section 61 and a partly reflective/partly transmitting section 63 which are selectively introduced into the viewfinder beam path 21. The three sections 59, 61, 63 can, for example, be arranged at a vision mixer carousel by whose rotation the desired section is brought into the viewfinder beam path 21.

Alternatively to such a carousel, the vision mixer 35 can also permit a continuous variation of the splitter ratio so that the relative portions of the two presentations, that is of the taken image reproduced at the matt glass screen 33 and of the additional image reproduced by the display 37, can be offset with respect to one another for the viewer. The vision mixer 35 can, for example, have a liquid crystal mirror with controllable transmission so that a larger portion of the taken image or a larger portion of the additional image is directed in the direction of the viewfinder 29 in dependence on the arrangement of the liquid crystals.

It must finally be noted that the embodiments explained in connection with FIGS. 1 to 8 can be combined with one another in any form in order to use the vision mixer 35 and the display 37 with even greater variety.

REFERENCE NUMERAL LIST 11 optical receiving system
13 receiving beam path
15 mirror aperture
17 drive unit
19 taking beam path
21 viewfinder beam path
23 transmission region
25 masked region
27 taking sensor
29 viewfinder
31 signal output
33 matt glass screen
35 optical vision mixer
37 electronic display
39 signal input
41 signal processing device
43 control device
45 image memory device
47 external memory device
49 evaluation and control device
51 image generator
53 range finder device
55 photodetector
57 brightness regulation device
59 fully transmitting section
61 fully reflective section
63 partly reflective/partly transmitting section

The invention claimed is:

1. An electronic motion picture camera, having an optical receiving system (11) and a rotating mirror aperture (15) which directs a taken image imaged by the optical receiving system (11) alternately along a taking beam path (19) in the direction of an optoelectronic taking sensor (27) and along a viewfinder beam path (21) in the direction of an optical viewfinder (29), wherein a matt glass screen (33) is arranged in the viewfinder beam path (21) such that the taken image directed along the viewfinder beam path (21) is imaged on the matt glass screen (33), wherein the camera has a signal processing device (41) which is connected to the taking sensor (27) and which processes a signal produced by the taking sensor (27), wherein the camera has an electronic display (37) which is connected to the signal processing device (41) and which reproduces the processed signal as an additional image substantially at the same time when the taking sensor (27) produces the signal, wherein an optical vision mixer (35) is arranged in the viewfinder beam path (21) between the matt glass screen (33) and the optical viewfinder (29), wherein the optical vision mixer (35) is adapted to direct the taken image imaged on the matt glass screen (33) and the additional image reproduced by the electronic display (37) in the direction of the viewfinder (29), and wherein the camera has a control device (43) which controls the rotating mirror aperture (15), the taking sensor (27) and the electronic display (37) such that the taken image imaged on the matt glass screen (33) and the additional image reproduced by the electronic display (37) are shown substantially alternately in the viewfinder (29).

2. A camera in accordance with claim 1, wherein the camera has an evaluation and control device (49) which is connected to the electronic display (37), with the reproduction time or the reproduction frequency of stored or read-in motion picture data or still picture data at the electronic display (37) being able to be controlled by means of the control and evaluation device (49) in dependence on the camera movement.

3. A camera in accordance with claim 1, wherein the electronic display (37) has a liquid crystal monitor, a TFT monitor or a CRT monitor.

4. A camera in accordance with claim 1, wherein the image section of the taken image imaged by the optical receiving system (11) in the viewfinder (29) and observable there is larger than the image section of the taken image actually taken by the taking sensor (27).

5. A camera in accordance with claim 1, wherein the electronic display (37) and the matt glass screen (33) are arranged in the same object plane of the viewfinder (29).

6. A camera in accordance with claim 1, wherein the camera is made as a digital electronic motion picture camera with a digitizing device (41) connected downstream of the taking sensor (27).

7. A method for presenting a taken image and an additional image in an optical viewfinder (29) of an electronic motion picture camera, comprising the steps of:

imaging the taken image along a receiving beam path (13) by means of an optical receiving system (11);

directing the taken image alternately along a taking beam path (19) in the direction of a taking sensor (27) and along a viewfinder beam path (21) in the direction of a viewfinder (29) by means of a rotating mirror aperture (15) arranged in the receiving beam path (13);

imaging the taken image directed along the viewfinder beam path (21) on a matt glass screen (33);

processing a signal produced by the taking sensor (27);

reproducing the processed signal as the additional image by means of an electronic display (37) substantially at the same time when the taking sensor (27) produces the signal;

directing the taken image imaged on the matt glass screen (33) and the additional image reproduced by the electronic display (37) in the direction of the viewfinder (29); and controlling the rotating mirror aperture (15), the taking sensor (27) and the electronic display (37) such that the taken image imaged on the matt glass screen (33) and the additional image reproduced by the electronic display (37) are shown substantially alternately in the viewfinder (29).

8. An electronic motion picture camera, having an optical receiving system (11) and a beam splitter (15) which splits a receiving beam path (13) into a taking beam path (19) leading to an optoelectronic taking sensor (27) and a viewfinder beam path (21) leading to an optical viewfinder (29), wherein the camera has an image memory device (45) which stores motion picture data or still picture data produced by the taking sensor (27), wherein the camera has an electronic display (37) which is connected to the image memory device (45) and which reproduces the stored motion picture data or still picture data as an additional image, and wherein an optical vision mixer (35) is arranged in the viewfinder beam path (21) which directs a taken image imaged along the viewfinder beam path (21) by the optical receiving system (11) and the additional image reproduced by the electronic display (37) in the direction of the viewfinder (29) such that the stored motion picture data or still picture data are superimposed on the taken image in the viewfinder (29) while a signal of the taking sensor (27) representing the taken image is delivered to a signal output (31) of the camera.

9. A camera in accordance with claim 8, wherein the electronic display (37) has a signal input (39), and wherein the electronic display (37) is adapted to reproduce motion picture data or still picture data read in via the signal input (39).

10. A camera in accordance with claim 8, wherein the optical vision mixer (35) simultaneously directs the taken image imaged by the optical receiving system (11) and the additional image reproduced by the electronic display (37) in the direction of the viewfinder (29).

11. A camera in accordance with claim 8, wherein the optical vision mixer (35) has a partly transmitting mirror.

12. A camera in accordance with claim 8, wherein the beam splitter has a rotating mirror aperture (15) which alternately directs the taken image imaged by the optical receiving system (11) in the direction of the taking sensor (27) and in the direction of the viewfinder (29).

13. A camera in accordance with claim 8, wherein a matt glass screen (33) is arranged in the viewfinder beam path (21), wherein the optical vision mixer (35) is arranged between the matt glass screen (33) and the viewfinder (29) and wherein the optical receiving system (11) images the taken image on the matt glass screen (33).

14. A method for presenting a taken image and an additional image in an optical viewfinder (29) of an electronic motion picture camera, comprising the steps of:

imaging the taken image along a receiving beam path (13) by means of an optical receiving system (11);

splitting the receiving beam path (13) into a taking beam path (19) leading to a taking sensor (27) and a viewfinder beam path (21) leading to the optical viewfinder (29);

producing motion picture data or still picture data by means of the taking sensor (27);

storing the motion picture data or still picture data in an image memory device (45);

reproducing the stored motion picture data or still picture data as the additional image by means of an electronic display (37); and directing the taken image imaged along the viewfinder beam path (21) and the additional image reproduced by the electronic display (37) in the direction of the viewfinder (29) such that the stored motion picture data or still picture data are superimposed on the taken image in the viewfinder (29) while a signal of the taking sensor (27) representing the taken image is delivered to a signal output (31) of the camera.

15. A method in accordance with claim 14, wherein the step of splitting the receiving beam path (13) comprises alternately directing the taken image in the direction of the taking beam path (19) and the viewfinder beam path (21) by means of a rotating mirror aperture (15).

16. A method in accordance with claim 14, wherein the step of splitting the receiving beam path (13) comprises imaging the taken image on a matt glass screen (33) arranged in the viewfinder beam path (21).

17. An electronic motion picture camera, having an optical receiving system (11) and a beam splitter (15) which splits a receiving beam path (13) into a taking beam path (19) leading to an optoelectronic taking sensor (27) and a viewfinder beam path (21) leading to an optical viewfinder (29), wherein the camera has an electronic display (37) which has a signal input (39) and which reproduces motion picture data or still picture data supplied via the signal input (39) as an additional image, and wherein an optical vision mixer (35) is arranged in the viewfinder beam path (21) which directs a taken image imaged along the taking beam path (19) by the optical receiving system (11) and the additional image reproduced by the electronic display (37) in the direction of the viewfinder (29) such that the motion picture data or still picture data supplied via the signal input (39) are superimposed on the taken image in the viewfinder (29) while a signal of the taking sensor (27) representing the taken image is delivered to a signal output (31) of the camera.

18. A camera in accordance with claim 17, wherein the electronic display (37) is connected to an image memory device (45) connected to the taking sensor (27), and wherein the electronic display (37) is adapted to reproduce motion picture data or still picture data of the taking sensor (27) stored in the image memory device (45) as an additional image.

19. A camera in accordance with claim 17, wherein the beam splitter has a rotating mirror aperture (15) which alternately directs the taken image imaged by the optical receiving system (11) in the direction of the taking sensor (27) and in the direction of the viewfinder (29).

20. A camera in accordance with claim 17, wherein a matt glass screen (33) is arranged in the viewfinder beam path (21), wherein the optical vision mixer (35) is arranged between the matt glass screen (33) and the viewfinder (29) and wherein the optical receiving system (11) images the taken image on the matt glass screen (33).

21. A method for presenting a taken image and an additional image in an optical viewfinder (29) of an electronic motion picture camera, comprising the steps of:
- imaging the taken image along a receiving beam path (13) by means of an optical receiving system (11);
- splitting the receiving beam path (13) into a taking beam path (19) leading to a taking sensor (27) and a viewfinder beam path (21) leading to the optical viewfinder (29);
- supplying motion picture data or still picture data from an external memory device (47) to the electronic display (37);
- reproducing the motion picture data or still picture data as the additional image by means of an electronic display (37); and
- directing the taken image imaged along the viewfinder beam path (21) and the additional image reproduced by the electronic display (37) in the direction of a viewfinder (29) such that the motion picture data or still picture data supplied from the external memory device are superimposed on the taken image in the viewfinder (29) while a signal of the taking sensor (27) representing the taken image is delivered to a signal output (31) of the camera.

22. A method in accordance with claim 21, wherein the step of splitting the receiving beam path (13) comprises alternately directing the taken image in the direction of the taking beam path (19) and the viewfinder beam path (21) by means of a rotating mirror aperture (15).

23. A method in accordance with claim 21, wherein the step of splitting the receiving beam path (13) comprises imaging the taken image on a matt glass screen (33) arranged in the viewfinder beam path (21).

24. An electronic motion picture camera, having an optical receiving system (11) which images a taken image along a receiving beam path (13), and a mirror aperture (15) which has a transmission region (23) and a mirror-coated masking region (25),
- wherein the mirror aperture (15) is adapted to direct the taken image imaged by the optical receiving system (11) selectively along a taking beam path (19) in the direction of an optoelectronic taking sensor (27) if the transmission region (23) is located in the receiving beam path (13), or along a viewfinder beam path (21) in the direction of an optical viewfinder (29) if the mirror-coated masking region (25) is located in the receiving beam path (13),
- wherein the camera has a signal processing device (41) which is connected to the taking sensor (27) and which processes a signal produced by the taking sensor (27),
- wherein the camera has an electronic display (37) which is connected to the signal processing device (41) and which reproduces the processed signal as an additional image substantially at the same time when the taking sensor (27) produces the signal,
- wherein an optical vision mixer (35) is arranged in the viewfinder beam path (21) which is adapted to direct the taken image imaged along the viewfinder beam path (21) by the optical receiving system (11) or the additional image reproduced by the electronic display (37) in the direction of the viewfinder (29), and
- wherein the camera has a control device (43) which controls the mirror aperture (15) and the electronic display (37) such that during a sequence of a plurality of successive motion pictures,
- the transmission region (23) of the mirror aperture (15) is moved into the receiving beam path (13), wherein the optical receiving system (11) continuously images the taken image along the taking beam path (19) on the taking sensor (27), and
- the electronic display (37) continuously reproduces the processed signal as the additional image.

25. A method for presenting a taken image in an optical viewfinder (29) of an electronic motion picture camera, comprising the steps of:
- imaging the taken image along a receiving beam path (13) by means of an optical receiving system (11);
- arranging a mirror aperture (15) in the receiving beam path (13), wherein the mirror aperture (15) has a transmission region (23) and a mirror-coated masking region (25);
- selectively moving the transmission region (23) of the mirror aperture (15) into the receiving beam path (13), thereby directing the taken image imaged by the optical receiving system (11) along a taking beam path (19) in the direction of an optoelectronic taking sensor (27), or moving the mirror-coated masking region (25) of the mirror aperture (15) into the receiving beam path (13), thereby directing the taken image imaged by the optical receiving system (11) along a viewfinder beam path (21) in the direction of an optical viewfinder (29);
- processing a signal produced by the taking sensor (27);
- reproducing the processed signal as an additional image by means of an electronic display (37) substantially at the same time when the taking sensor (27) produces the signal;
- directing the taken image imaged along the viewfinder beam path (21) or the additional image reproduced by the electronic display (37) in the direction of the viewfinder (29); and
- controlling the mirror aperture (15) and the electronic display (37) such that during a sequence of a plurality of successive motion pictures,
- the transmission region (23) of the mirror aperture (15) is located in the receiving beam path (13), wherein the optical receiving system (11) continuously images the taken image along the taking beam path (19) on the taking sensor (27), and
- the electronic display (37) continuously reproduces the processed signal as the additional image.

* * * * *